United States Patent
Bell

(10) Patent No.: US 8,868,959 B1
(45) Date of Patent: *Oct. 21, 2014

(54) LOGICAL BATTERY PARTITIONS

(71) Applicant: Google Inc., Mountain View, CA (US)

(72) Inventor: Jory Bell, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,822

(22) Filed: Dec. 18, 2012

Related U.S. Application Data

(63) Continuation of application No. 12/982,162, filed on Dec. 30, 2010, now Pat. No. 8,356,199, which is a continuation of application No. 11/702,010, filed on Feb. 1, 2007, now Pat. No. 7,873,852.

(51) Int. Cl.
  *G06F 1/26* (2006.01)
  *G06F 9/50* (2006.01)

(52) U.S. Cl.
  CPC .................................. *G06F 9/5094* (2013.01)
  USPC ............................ 713/340; 455/574; 718/104

(58) Field of Classification Search
  CPC ...................................................... G06F 9/5094
  USPC ............................ 713/340; 455/574; 718/104
  See application file for complete search history.

(56) References Cited

U.S. PATENT DOCUMENTS

| | | | |
|---|---|---|---|
| 6,687,839 B1 | 2/2004 | Tate et al. | |
| 6,856,922 B1 | 2/2005 | Austin et al. | |
| 6,976,179 B1 | 12/2005 | Gosselin et al. | |
| 7,583,951 B2 | 9/2009 | Gibbs | |
| 7,629,765 B2 | 12/2009 | Chen et al. | |
| 8,004,234 B2 * | 8/2011 | Walrath | 320/107 |
| 2006/0117193 A1 | 6/2006 | Gosselin et al. | |
| 2006/0143483 A1 | 6/2006 | Liebenow | |

* cited by examiner

*Primary Examiner* — Albert Wang
(74) *Attorney, Agent, or Firm* — Morris & Kamlay LLP

(57) ABSTRACT

A logical battery partitioning approach is disclosed. In one embodiment, a power management system in a portable computing device having a plurality of subsystems can include: (i) a battery coupled to a plurality of subsystems; (ii) a first battery variable provided to a first subsystem to indicate a characteristic of a first logical battery partition; and (iii) a second battery variable provided to a second subsystem to indicate a characteristic of a second logical battery partition. A battery variable can include an accessibility control, or a percent of battery power available, for example.

14 Claims, 5 Drawing Sheets

LOGICAL BATTERY PARTITIONS

This is a continuation application of U.S. application Ser. No. 11/702,010, filed Feb. 1, 2007, now allowed, the contents of which are hereby incorporated by reference into this application.

FIELD OF THE INVENTION

The invention relates in general to battery powered devices, and more specifically to battery power management using logical partitioning and/or information flow between a battery and a device or subsystem.

BACKGROUND

Increasing use of portable computing or electronic devices has led to increased reliance on battery power. Devices such as cell phones, personal digital assistants (PDAs), small computers, e-mail devices, audio players, video players, etc., are complex devices often having many functions and subsystems. Typically, one battery is used to provide all of the device's power needs.

Some devices, such as portable computers, allow power-management. Thus, it is possible to designate when a portable computer will go into a low-power mode after an interval of non-use. Low power modes can include standby, hibernate, and the like. Other ways to manage power can include controlling subsystems such as the display screen, disk drive, etc., and placing these subsystems in higher or lower power modes according to determinations made by hardware or software running in the device, or according to determinations made by a user of the device. However, because battery power is so important to a portable device, it is desirable to provide more control and flexibility over the device's use of battery power and in how a device interacts with a battery.

SUMMARY

A logically partitioned battery in accordance with embodiments of the present invention can be utilized to implement a power conservation regime that can increase emergency life, reduce feature power grab during lower or moderate power situations, and/or otherwise extend an overall utility of a device. Logical battery partition constraints can be imposed on a device's subsystems by mechanisms in the battery and/or associated battery management circuitry without necessarily requiring coordination with other device electronics and/or software. Further, the charging and/or discharging of the battery itself can be regulated according to such logical partitions. In effect, a single physical power source may "look" different to different subsystems by using such logical battery partitioning.

In one embodiment, a power management system in a portable computing device having a plurality of subsystems can include: (i) a battery coupled to the subsystems; (ii) a first battery variable provided to a first subsystem to indicate a characteristic of a first logical battery partition; and (iii) a second battery variable provided to a second subsystem to indicate a characteristic of a second logical battery partition.

In one embodiment, a user interface for logical battery partition control in a portable computing device can include: (i) a first portion for configuring a number of logical battery partitions; (ii) a second portion for mapping between an application and at least one of the logical battery partitions; and (iii) a third portion for indicating a function for each of the logical battery partitions.

In one embodiment, a method of controlling logical battery partitions in a portable computing device supporting a plurality of applications can include: (i) arranging the logical battery partitions; (ii) monitoring each of the logical battery partitions; and (iii) adjusting a battery variable accessed by at least one of a plurality of applications.

DETAILED DESCRIPTION

Electronic devices and batteries typically interface or provide information flow, such as: alarm flags, over/under-voltage notifications, over/under-current notifications, average current flow, instantaneous current flow, estimates of total charge left in the battery, numerical integration of current flow measurements, cycle times, total cycles expended, temperature measurements, fuel gauges, safety circuit status, as well as charge/discharge device status, for example.

In particular embodiments, supplemental information can be provided, such as: (i) a structure of logical battery partitions; (ii) an amount of energy stored or a percentage of charge available in one or more of the battery partitions; (iii) a current flow into or out of one or more of the battery partitions; (iv) a status of one or more devices or current flow controllers that can indicate a charge/discharge of one or more of the battery partitions; and/or (v) a pattern of signals that may be needed to initiate charge/discharge of one or more such partitions.

Figure 1:
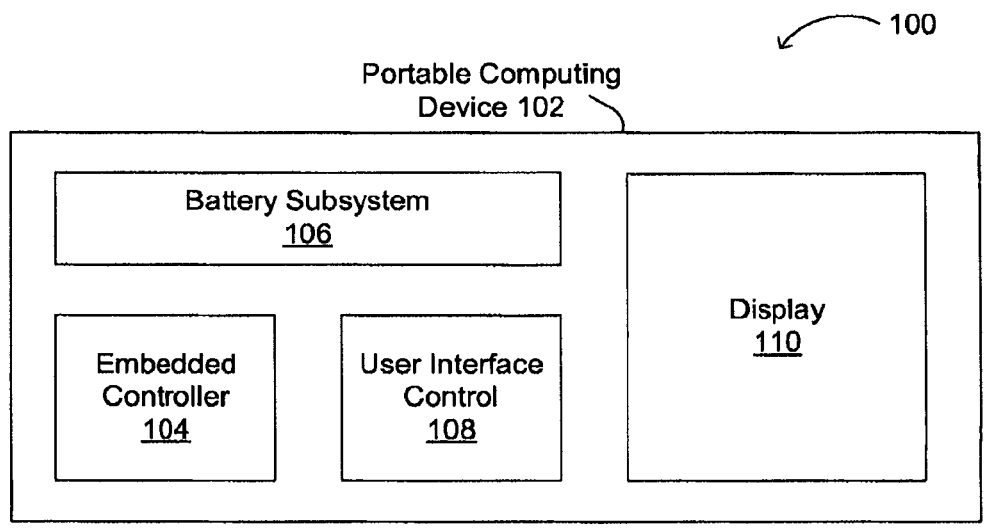
FIG. 1 illustrates an example portable computing device arrangement in accordance with embodiments of the present invention.

Referring now to FIG. 1, an example portable computing device arrangement in accordance with embodiments of the present invention is indicated by the general reference character 100. Portable computing device 102 can include embedded controller 104, battery subsystem 106, user interface control 108, and display 110, for example. Although battery subsystem 106 is described primarily with respect to batteries, it can include any other suitable type of energy-providing mechanisms, such as capacitors and/or any suitable combination of capacitors and batteries. Also, some features described herein may be adaptable to any other type of power source, such as where an external battery is used (e.g., a device obtaining power from a vehicle's battery), or where a standard line power is used (e.g., alternating current residential or business infrastructure power).

In particular embodiments, portable computing devices or other modular electronic devices capable of performing multiple functions may be able to extend a utility by prioritizing power functions. Accordingly, relatively low power functions may be available for a substantial period of time after relatively high power functions may no longer be accessible. For example, a cell phone may lose an ability to display color, graphics, or elaborate sounds, yet the cell phone can still maintain an ability to dial "911" or another emergency access number. Further, such a cell phone may benefit from a logical battery partitioning that can protect dialing functions even when other functions may no longer be able to operate due to power constraints.

Some multi-purpose devices can have a much higher general utility or emergency utility than others, and such priorities can be assigned based on predetermined settings, such as may be provided via a user interface, for example. A logically partitioned battery can be utilized to implement a power conservation regime that can increase emergency life, reduce feature power grab during lower or moderate power situations, and/or can otherwise extend an overall utility of the device. For example, this can be done by constraining lower priority functions, applications, and/or subsystems from power consumption when a higher priority request for power is made.

In addition, the prioritization of power accessing resources, as well as other features associated with logical battery partitions, can be managed without substantially relying on algorithms. For example, such algorithms may be supported by high level functions (e.g., running a particular program) that may not be in operation at a given time, or that may be otherwise relatively power hungry. Accordingly, these logical battery partition constraints can be imposed on a device's subsystems by mechanisms in the battery and/or associated battery management circuitry without necessarily requiring coordination with other device electronics and/or software. Further, the charging and/or discharging of the battery itself can be regulated according to such logical partitions.

Figure 2:
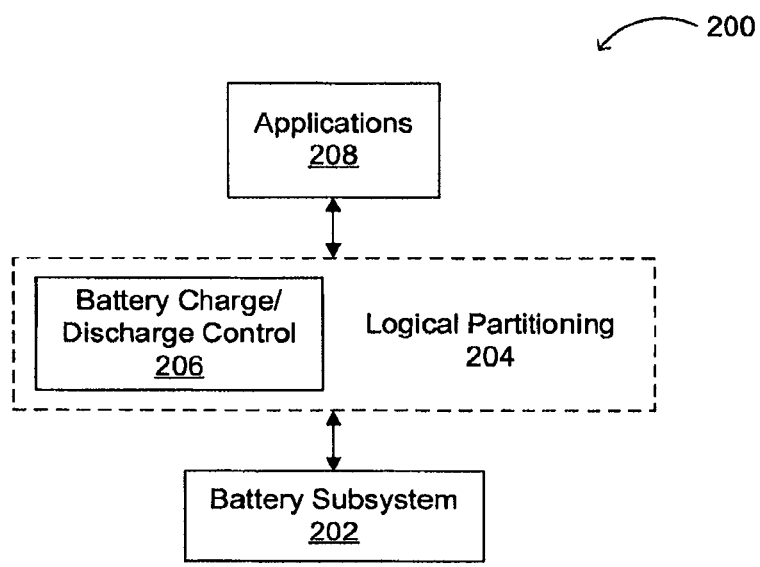
FIG. 2 shows an example logical battery partitioning structure in accordance with embodiments of the present invention.

Referring now to FIG. 2, an example logical battery partitioning structure in accordance with embodiments of the present invention is indicated by the general reference character 200. Battery subsystem 202 can interface with logical partitioning 204. For example, logical partitioning 204 may include battery charge/discharge control 206. Also, applications 208 can interface with logical partitioning 204. Further, "applications" as used herein can include any process, hardware subsystem, internal or external device, software-controlled function, software application, virtual computer, shared hardware resource, battery monitoring tools or protocols, or other appropriate entity.

Logical battery partitioning in accordance with embodiments of the present invention can generally provide battery variable control, such as charge/discharge control, accessibility control, and information flow to/from associate applications. Further, control or adjustment to such battery variables can be done in accordance with predetermined settings, as may be provided by a user or managed by an administrator, may be machine learnable, or may be preset to certain values, for example. Also, logical battery partitions including power-based partitions may be maintained relatively close to a physical battery system.

In particular embodiments, battery charge or drain (i.e., "use") control based on logical battery partitions can be utilized such that: (i) certain portions or logical battery partitions can be used before, after, or concurrently with other battery portions; (ii) various logical battery partitions can be used together, independently, or in any other scheme as determined via predetermined settings; (iii) a battery will or will not charge in particular modes of software or by portions of hardware, regardless of a measurement by that hardware subsystem of the battery being relatively full or relatively empty; and/or (iv) multiple software applications or other battery monitoring tools can gather different suites of information from the battery so that one application may be unable to draw charge from the battery while another is capable of drawing charge on demand.

A logical battery partition can be configured so that its use in particular modes of software or by portions of hardware are regulated by controlling an interface between the battery and/or battery management control and a mapped device, subsystem, application, or the like. Further, such interface control can include providing battery measurement information to the device or a subsystem relating to a battery partition, regardless of the actual status of the battery itself. For example, a request for a battery measurement by a hardware subsystem can result in the battery management system providing an indication of the battery being relatively full or relatively empty, regardless of the actual battery charge, in order to reflect the management system's desire to allocate the subsystem's energy use to a particular logical partition.

In particular embodiments, logical battery partitions can be used such that designated portions of a battery can have access thereto restricted or allowed by particular: (i) modes of software; (ii) portions of hardware; (iii) battery protocols; and/or (iv) modes of control. Of course, any suitable access control can also be utilized in accordance with embodiments of the present invention.

In particular embodiments, information flow to/from associated applications can be used such that: (i) multiple software applications, hardware subsystems or devices, or other battery monitoring tools or protocols can gather different information from the battery; (ii) a battery that deliberately indicates an empty status to certain applications, hardware subsystems, or battery monitoring tools or protocols when the battery is in fact not empty; (iii) a battery that deliberately indicates a full status to certain applications, hardware subsystems, or battery monitoring tools or protocols when the battery is in fact not full; (iv) a battery that can indicate a full or an empty status depending upon criteria determined in part or in full by an application, device, tool, or protocol querying or examining the battery; and/or (v) a mechanism for configuring any such criteria so that higher level applications, tools, or protocols can revisit the priorities, partitions, or any predetermined setting associated with the battery.

Figure 3:
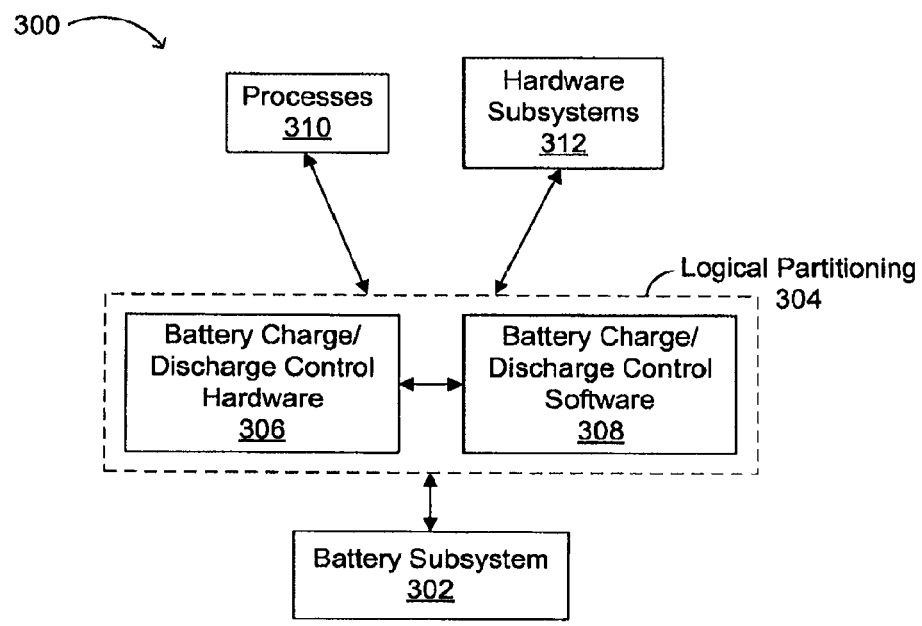
FIG. 3 shows an example system including logical battery partitioning in accordance with embodiments of the present invention.

Referring now to FIG. 3, an example system including logical battery partitioning in accordance with embodiments of the present invention is indicated by the general reference character 300. Battery subsystem 302 can interface with logical partitioning 304. For example, logical partitioning 304 may include one or more battery charge/discharge control hardware 306, as well as one or more battery charge/discharge control software 308. Also, applications that may interface with logical partitioning 304 can include processes 310 and hardware subsystems 312.

Battery charge/discharge hardware 306 can be physically located within battery subsystem 302, in hardware subsystems 312, or in any other suitable location. For example, battery charge/discharge hardware 306 can be included in a battery adapter for battery subsystem 302. Further, as will be discussed in more detail below, processes 310 and/or hardware subsystems 312 can include one or more systems (e.g., hardware systems) that may be partially or fully integrated with other system components. Also, hardware subsystems 312 may include one or more processes (e.g., 310). Thus, in particular embodiments, a software process might span different hardware subsystems.

Also, a software process might have different power modes so as to scale depending on battery charge available. In particular embodiments, such available battery charge may be available charge for a designated partition, or the available battery charge may represent charge from another partition, or another group of battery partitions. In this fashion, applications such as software processes can utilize battery charge associated with one or more logical battery partitions.

In particular embodiments, hardware subsystems 312 may be equipped to communicate battery information. Alternatively, in particular embodiments where hardware subsystems 312 may not be equipped so as to communicate battery information, another device or dedicated hardware resource may be employed to facilitate such communication.

Figure 4:
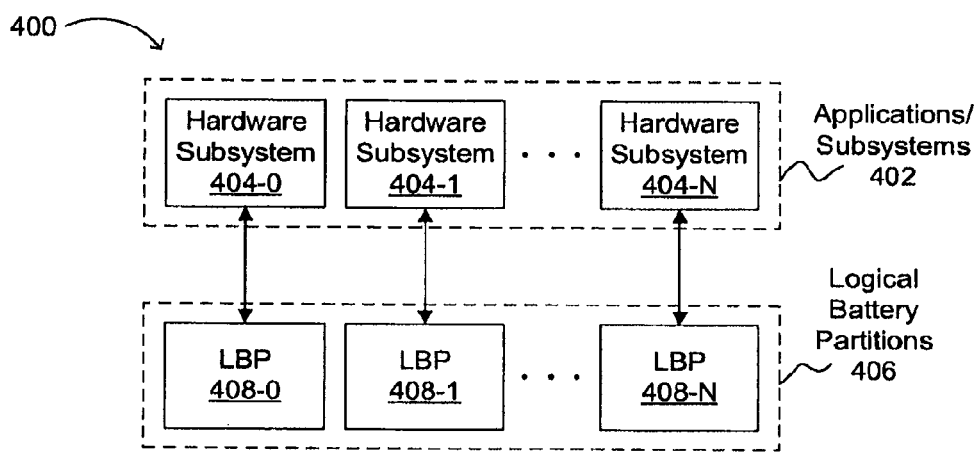
FIG. 4 shows an example logical battery partition arrangement and mapping to subsystems in accordance with embodiments of the present invention.

Referring now to FIG. 4, an example logical battery partition arrangement and mapping to subsystems in accordance with embodiments of the present invention is indicated by the general reference character 400. Applications/subsystems 402 can include any number of subsystems, processes, applications, or the like. For example, applications/subsystems 402 can include hardware subsystems 404-0, 404-1, . . . through 404-N. Also, logical battery partitions 406 can correspond or be mapped to the hardware subsystems in this particular example. Accordingly, logical battery partitions 406 can be arranged as logical battery partitions (LBP) 408-0, 408-1, . . . through 408-N, and LBP 408-0 can map to hardware subsystem 404-0, LBP 408-1 can map to hardware subsystem 404-1, and so on through LBP 408-N mapping to hardware subsystem 404-N.

Thus, a particular hardware subsystem may interface with a corresponding logical battery partition, and not necessarily directly with a physical battery subsystem. For example, hardware subsystem 404-1 may access LBP 408-1 with a request for battery availability, and LBP 408-1 may indicate to hardware subsystem 404-1 that a certain percentage of battery power is available, whereas LBP 408-N may indicate to hardware subsystem 404-N that a completely different percentage of battery power remains when faced with the same request and a same physical battery power. In this fashion, any designated battery variable can be controlled by a logical battery-partition, and a corresponding hardware subsystem can remain essentially unaware of this logical partitioning layer.

Figure 5:
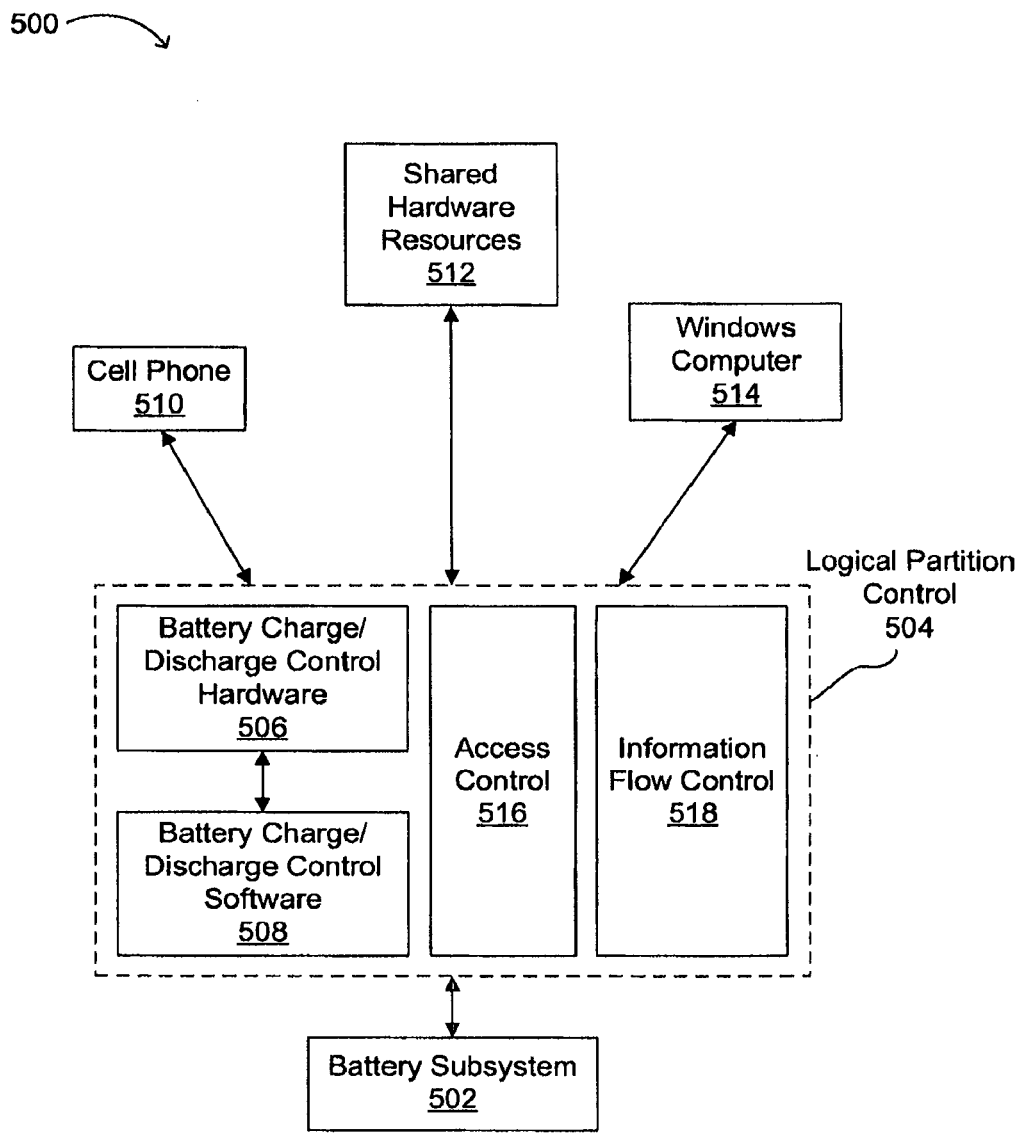
FIG. 5 illustrates a block level diagram of an example system including various hardware subsystems in accordance with embodiments of the present invention.

Referring now to FIG. 5, a block level diagram of an example system including various hardware subsystems in accordance with embodiments of the present invention is indicated by the general reference character 500. Battery subsystem 502 can interface with logical partition control 504. For example, logical partition control 504 may include battery charge/discharge control hardware 506, as well as battery charge/discharge control software 508. In addition, logical partition control 504 can include access control 516 and information flow control 518.

In particular embodiments, logical battery partitioning can be effectuated by battery control/management system and/or circuitry (e.g., logical partition control 504) within the battery subsystem (e.g., 502) itself, or associated therewith, to create the impression in associated device subsystems that there are multiple different batteries. Thus, in particular embodiments, these associated subsystems may not be explicitly aware of this logical partitioning effect. In this fashion, associated subsystems can react to reports of characteristics (e.g., charge, voltage, etc.) of a mapped logical battery partition, and the given partition may essentially be a fabrication created by the battery management system in order to prioritize power use in the device, or adjust any other battery variable, for example.

Applications that may interface with logical partition control 504 can include cell phone 510, shared hardware resources 512, and Windows OS-based computer 514, for example. As another example, an MP3 player and a cell phone (e.g., 510) may be integrated into one "device" with separate processors, but that can share input/output or another hardware resource (e.g., 512), such as a display screen, a keyboard, connectors, or the like. In such a case, a shared battery resource (e.g., a logical battery partition or battery bus) can be utilized for one or more of the applications and/or devices in the system.

Figure 6:
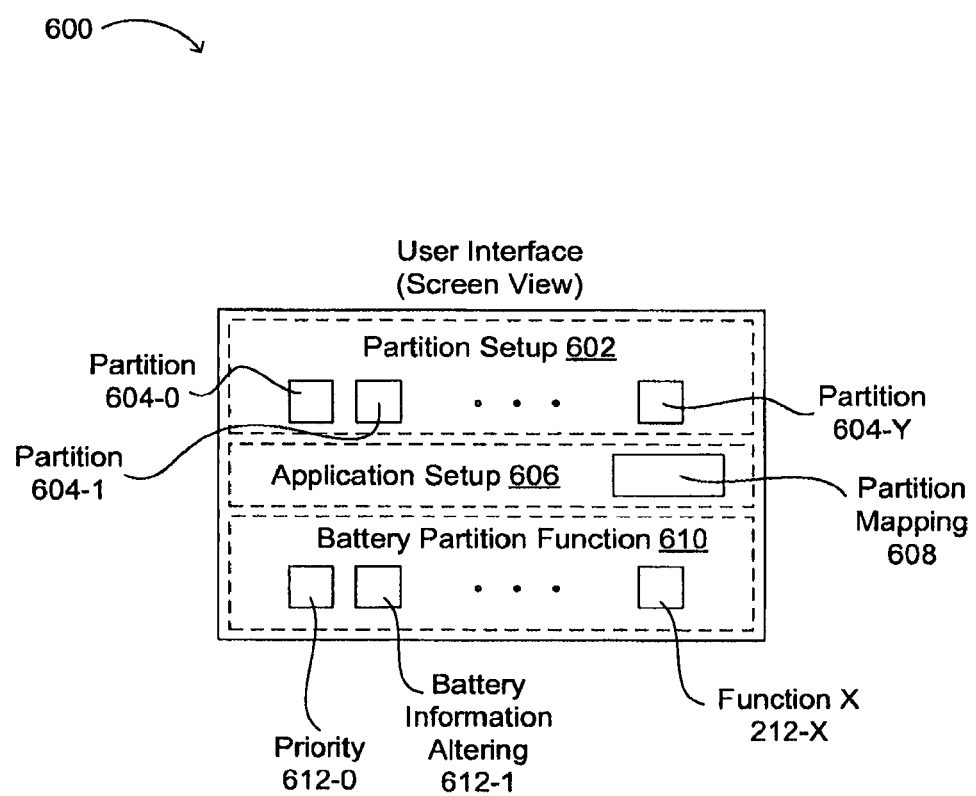
FIG. 6 shows an example user interface for logical battery partition management in a portable computing device in accordance with embodiments of the present invention.

Referring now to FIG. 6, an example user interface for logical battery partition management in a portable computing device in accordance with embodiments of the present invention is indicated by the general reference character 600. An example user interface can include partition setup 602, application setup 606, and battery partition function 610. Partition setup 602 can include partition 604-0, partition 604-1, partition 604-Y, and may be used to define logical battery partitions. Application setup 606 can include partition mapping 608, and may be used to map an application to a particular logical battery partition. Battery partition function 610 can include priority 612-0, battery information altering 612-1, . . . function X 212-X, and may be used to designate supported functions for each logical battery partition.

Such predetermined settings, as may be utilized for control or adjustment to associated battery variables, may be provided by a user or managed by an administrator, may be machine learnable, or may be preset to certain values, for example. Thus, particular embodiments may not require that a user input any or all such interface options. However, any preferences or predetermined settings that a user might provide (e.g., via a user interface), or that may be provided by another means, can be saved for future access. In particular embodiments, battery subsystems can include or be associated with unique identifiers (IDs), or nonvolatile storage elements (e.g., electrically erasable programmable read-only memory (EEPROM)) can be utilized to save such preferences. In this fashion, a particular logical partitioning arrangement can be associated with a physical battery, for example.

Figure 7:
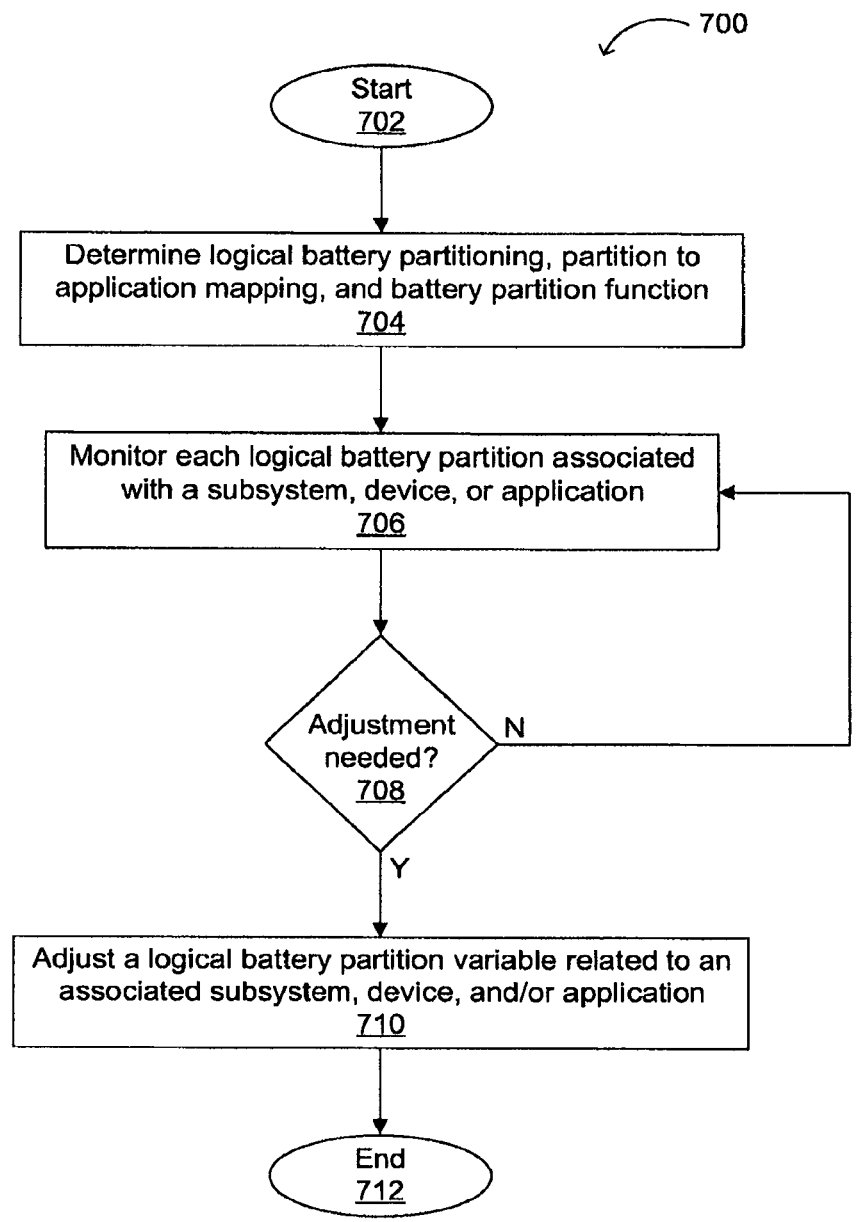
FIG. 7 shows a simplified flow diagram of an example method of controlling logical battery partitions in accordance with embodiments of the present invention.

Referring now to FIG. 7, a simplified flow diagram of an example method of controlling logical battery partitions in accordance with embodiments of the present invention is indicated by the general reference character 700. The flow can begin (702) and a logical battery partitioning, partition mapping to applications, and battery partition function, can be determined (704). Such predetermined settings can be input or provided by using a user interface, which can be viewed through a display in a portable computing device (e.g., display 110 of FIG. 1), for example.

Next, each battery partition associated with a subsystem, device, or application can be monitored (706). If no adjustment is needed (708), such monitoring (706) can continue. However, if an adjustment is needed (708), a battery partition variable related to an associated subsystem, device, and/or application can be adjusted (710) and the flow can complete (712). Further, control or adjustment to such battery variables can be done in accordance with predetermined settings, as may be provided by a user or managed by an administrator, may be machine learnable, or may be preset to certain values, for example.

Although particular embodiments of the invention have been described, variations of such embodiments are possible and are within the scope of the invention. For example, although specific logical battery partitioning and battery variables have been described, other types of partitioning and/or characteristics can be controlled in accordance with embodiments of the present invention. Also, applications other than portable computing devices or the like can also be accommodated in accordance with particular embodiments. Embodiments of the invention can operate among any one or more processes or entities including users, devices, functional systems, and/or combinations of hardware and software.

Any suitable programming language can be used to implement the functionality of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments unless otherwise specified. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. The functions may be performed in hardware, software or a combination of both.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. Functions and parts of functions described herein can be achieved by devices in different places and operating at different times. For example, a processor can perform its functions in "real time," "offline," in a "batch mode," etc. Parallel, distributed or other processing approaches can be used.

Reference throughout this specification to "one embodiment", "an embodiment", "a particular embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. For example, distributed, networked systems, components and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

The invention claimed is:

1. A power management system in a portable computing device, the power management system comprising:
    a battery having a plurality of logical battery partitions, each logical battery partition providing power to at least one of a plurality of applications of the portable computing device;
    a first battery variable to indicate a first characteristic of a first logical battery partition of the plurality of logical partitions, the first characteristic indicating an amount of power available to a first application of the plurality of applications;
    a second battery variable to indicate a second characteristic of a second logical battery partition of the plurality of logical partitions, the second characteristic indicating an amount of power available to a second application of the plurality of applications; and
    a power management system to adjust the amount of power available to each of the first and second application based upon a first and second priority assigned to the first and second applications, respectively.

2. The power management system of claim 1, wherein the power management system is configured to adjust the amount of power available to the first application based upon a predetermined setting.

3. The power management system of claim 2, wherein the predetermined setting is set by the portable computing device based upon an attribute of the first application obtained by the portable computing device via a machine learning technique.

4. The power management system of claim 2, wherein the predetermined setting is set by a user of the portable computing device.

5. The power management system of claim 1, wherein the first battery variable relates to an item selected from the group consisting of: a charge control, a discharge control, a percentage of remaining battery power, and an accessibility control.

6. The power management system of claim 1, wherein the battery includes a capacitor.

7. The power management system of claim 1, wherein the first priority is set by the portable computing device based upon an attribute of the first application obtained by the portable computing device via a machine learning technique.

8. A method performed within a power management system of a portable computing device, the method comprising:
    assigning a plurality of logical battery partitions within a battery;
    assigning each logical battery partition to provide power to at least one of a plurality of applications of the portable computing device;
    receiving a first priority of a first application of the plurality of applications;
    receiving a second priority of a second application of the plurality of applications; and
    adjusting the amount of power available to each of the first and second application based upon the first and second priority assigned to the first and second applications, respectively.

9. The method of claim 8, further comprising:
    Adjusting the amount of power available to the first application based upon a predetermined setting.

10. The method of claim 9, wherein the predetermined setting is set by the portable computing device based upon an attribute of the first application obtained by the portable computing device via a machine learning technique.

11. The method of claim 9, wherein the predetermined setting is set by a user of the portable computing device.

12. The method of claim 8, further comprising:
    Storing a first battery variable indicating to a value selected from the group consisting of: a charge control, a discharge control, a percentage of remaining battery power, and an accessibility control.

13. The method of claim 8, wherein the battery includes a capacitor.

14. The method of claim 8, wherein the first priority is set by the portable computing device based upon an attribute of the first application obtained by the portable computing device via a machine learning technique.

* * * * *